UNITED STATES PATENT OFFICE 2,647,832

PREPARATION OF PURE COPPER METAL FROM COPPER-BEARING SCRAP

Louis N. Allen, Jr., Short Hills, N. J., and Patrick J. McGauley, Glen Cove, and Edward S. Roberts, New York, N. Y., assignors to Chemical Construction Corporation, New York, N. Y., a corporation of Delaware Application June 1, 1950, Serial No. 165,524

7 Claims. (Cl. 75—108)

The present invention relates to the recovery of copper from metallic copper-bearing materials by leaching and precipitation. In particular, it relates to an improved processing method whereby any non-cuprous metals incidentally dissolved from the starting materials are quickly, simply and effectively discharged from the system.

In recent years the metals industries have been faced with a constantly increasing demand for non-ferrous metals, particularly copper, this has been accompanied by a decrease in the known reserves of high-grade ores and an increase in the costs of mining and refining the lower grades. As a result, more and more interest is being displayed in methods for recovery of metals for reuse. Not all of the methods now in use are wholly satisfactory. Especially is this true of copper recovery.

What is probably the best current practice in this field is readily described. Copper-bearing scrap is charged into large leaching vats and flooded with a dilute oxidized solution of ammoniacal copper carbonate. A portion of the leaching solution is drawn off, pumped through an oxidation tower and returned to the leaching tanks. In this manner the copper in solution is alternately oxidized to cupric salts and then returned to the cuprous condition in dissolving more copper. New barren solution is constantly added to the system and the pregnant solution is continuously withdrawn. Compared to the total liquor in use, these latter flows are so small that fluid movement through or over the scrap is almost negligible.

In this treatment, not only copper but any zinc and other soluble impurities are gradually dissolved into a collective but very dilute solution. The solution rates for the various metals differ. While copper and zinc dissolve at approximately the same rate, nickel dissolves more slowly. Lead will dissolve only up to about a certain concentration which then will remain substantially constant.

After withdrawal, the pregnant liquor is given a simple treatment. Ammonium carbonate and ammonia are distilled off and the copper recovered, principally, as impure copper oxide. The latter is collected, liquor is discarded from the system and the ammonia and carbon dioxide vapors are condensed in water to be reused in subsequent leaching.

Such a process is extremely slow. Normally, leaching of copper with these dilute solutions requires the metal scrap to remain in the leaching vats for at least three and often six or more weeks. This excessively long leaching period requires such a large and expensive inventory of both metal and ammonia in process that carrying charges become important in the total processing cost. An excessive leach tank capacity, amount of solution and auxiliary equipment is required. The relatively dilute leaching solutions have adequate time to dissolve much of the zinc and other copper contaminants. These are later precipitated as impurities in the copper oxide still product.

Such use of the still is unsatisfactory. For example, precipitated copper oxides build up on the inner wall and periodically must be removed by hand labor. High steam requirements are an important part of the cost. The resulting impure copper product must be reduced and refined to copper metal. Any lead or zinc will be distilled off during this operation. However, some metals, nickel for example, will remain in the copper. Its removal requires an expensive separation process. Therefore, the presence of nickel or the like therein markedly reduces the value of the impure oxides. Nevertheless, the economy of still operation makes the use of dilute leaching solutions desirable.

It would seem fairly simple to increase the leaching rate. For example, it would appear to be more desirable to increase the concentration of the leaching liquor. However, if this is done, the economy of still operation is radically altered. It becomes such as to offset any economic gain in the shorter time required for leaching.

There remains, therefore, a commercial demand for a process, the commercial utilization of which is not hampered by these drawbacks. One such process, disclosing a process utilizing methods which are faster, easier and more effective is disclosed in our copending application for United States Letters Patent, Serial No. 133,666, filed December 17, 1949.

In general, the process therein disclosed effectively accomplished its desired object by a combination of several modifications of the general practice. One comprises a radical alteration in the leaching practice. A second comprises a novel flow system for adding and recycling leaching fluid, whereby the system is maintained in material balance. A third comprises a novel flow system for reducing dissolved copper from spent leach solution to a metallic copper product which is 99.9+% pure. Accordingly, the overall process of our above-noted application may be roughly divided into three parts. These are the leaching operation, the system for separating copper from the pregnant liquor, and the system for reforming and recirculating the leach liquor.

As will be shown, the principal precautions with respect to the actual leaching of our above-noted process are preferably observed in the present invention. The remaining operations, which for purposes of illustration may be considered as constituting a series of separate but interlocking steps, are not as readily adapted to as wide a variety of feeds as might be desired. It is with improvements in these steps that the present invention is concerned. As such it provides an improved overall process.

While, as noted, our previous process is wholly operative, it is most effective when relatively small amounts of non-cuprous metals are present in, and consequently dissolved from the metallic materials being leached. However, it is often desirable to be able to handle a mixed feed containing not only high-copper-content scrap, blister copper and the like but much greater amounts of non-cuprous metals. This would necessitate leaching of mixtures containing brass, bronze, copper-clad steel and other materials containing zinc, lead, nickel, cobalt, iron and the like. Some recovery of precious and semi-precious metals may also be desirable. Treatment of native copper and some oxidized copper minerals is also sometimes desirable.

It will be seen that such practice would introduce a wide variety of possible copper contaminants into the system. Where obtaining high-grade copper is the principal consideration, it is necessary that the non-cuprous metals be as completely separated as possible. Preferably they should be so far as possible promptly and completely eliminated from the copper recovery system. Our previous process was not readily adapted to do so if large amounts were present. It is this object which the process of the present invention is designed to accomplish.

In general, this object is accomplished by modifications of the process of our previously-identified application. However, since the actual leaching operations are similar to that process, the precautions to be observed with respect thereto will be first noted. It was therein noted, for example, that using a circulation rate of from about 0.05 to 5.0 or higher feet per second of leach liquor over the piece being leached is markedly useful practice. Where it is possible to do so, this use of forced circulation is to be preferred. Also, the leaching rate varies with the cupric copper content of the liquor. At different times during a cycle this may be as little as 20, or less, or as high as 175, or more, grams per liter. However, the initial amount preferably should be less than about 100–110 grams.

In actual practice the details of the leaching operation are not wholly critical factors in the overall process. Any leaching system of tanks and return flows may be used provided they may use the ammoniacal copper leach liquors of the present process and provided the system provides an adequate side flow for oxidizing purposes.

It is, as was noted, with the remainder of the overall process that this invention is primarily concerned. Broadly, in accordance with the present invention one portion of the spent leach liquor is then treated to precipitate therefrom so much of its copper content as will precipitate in the desired degree of purity. This is collected and washed. The residual copper solution, usually together with wash water, and, if desired, an additional portion of spent leach liquor is then treated to precipitate all the dissolved residual copper regardless of its purity. The resultant copper-free liquor is treated to drive off the $NH_3$ and $CO_2$ content and precipitate the remaining dissolved metals. The latter precipitate is collected and removed from the system as a slurry in sufficient water to balance the system. Enough $CO_2$ to balance the system is driven off, the $NH_3$ being redissolved and recycled. In some cases the product of the complete Cu precipitation will be returned directly to leaching. In others, a part or all of it will be redissolved in the ammoniacal liquor being returned to the leaching system. The residual portion or flow of untreated spent leach liquor is oxidized and returned to the leaching steps.

The invention will be discussed more fully in conjunction with the accompanying drawings in which.

Figure 1:
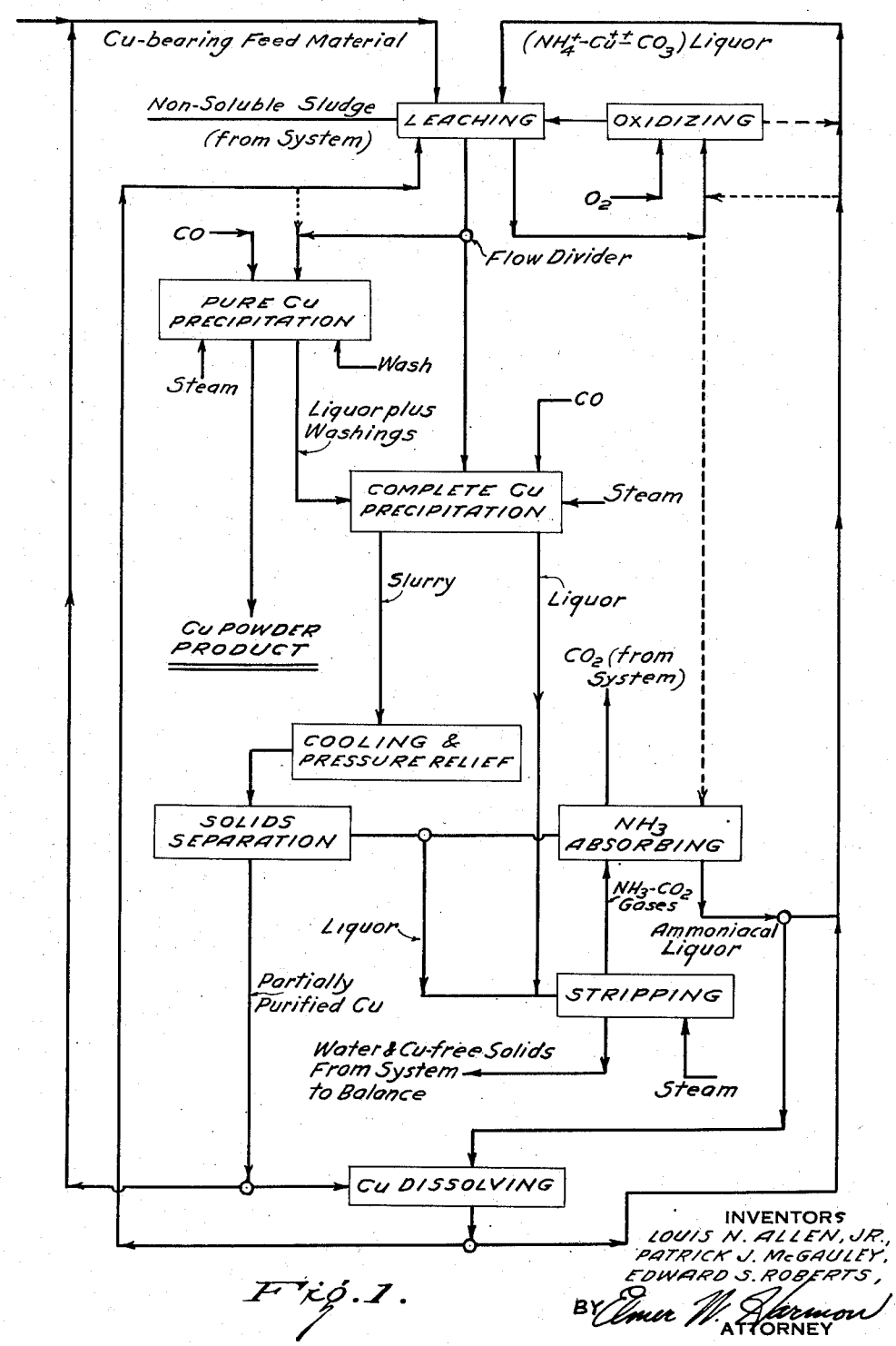
Figure 1 is a flow scheme of the overall system showing the principal operations.

As shown in the flow scheme, copper-containing materials, usually metallic, are fed to a suitable leaching system. Again, this is preferably, but not necessarily, the leaching system of our previously-discussed, copending application. In this step it is treated with an ammoniacal copper carbonate leach liquor for a sufficient time to dissolve the copper content of the feed materials.

Spent liquor withdrawn from the leach system is divided into several proportioned flows. One portion is ordinarily sent directly to the oxidation system and returned to leaching as shown on the drawing in Figure 1. The remainder, usually in two or more separate operations, is treated to recover the precipitatable copper content thereof. It is these precipitating operations which next should be considered.

Another portion or flow of the spent liquor, from which a copper powder product of electrolytic grade of purity is to be recovered, is treated directly for that purpose. This is shown as one operation in Figure 1 to simplify discussion. Actually several are involved and they will be discussed more fully in connection with Figures 2, 3, and 4. Broadly, however, in this operation the spent liquor is first caused to dissolve at least a sufficient amount and usually an excess of CO to reduce and precipitate the desired or optimum amount of pure copper. This is done under relatively cool conditions. Heat and pressure are then applied for the necessary time to precipitate only so much of the copper as precipitates in the desired degree of purity, i. e., a metallic content of 99.9% Cu, or better. This precipitated copper is collected, washed and dried as product.

The wash waters, together with the residual copper-bearing liquor are then treated to precipitate the total remaining dissolved copper. In this treatment, shown in Figure 1 as complete copper precipitation, a sufficient amount of CO is again used as the reducing agent. Illustrative methods of distributing and dissolving CO will be discussed more fully in conjunction with Figures 2, 3, and 4. Provision is made for an additional portion or flow of spent leach liquor to be also treated by this complete precipitation to separate out its entire copper content.

It is a feature of the present process that while this complete copper precipitate is not as pure as the first copper product and may even be unsaleable low grade, it is a product having a much higher copper-impurity ratio than is true of the solution from which it comes and is usually more pure than the original feed. It has lost both its proportionate amount of insolubles in the leach residue and its proportionate amount of unprecipitated dissolved metals. Like the pure copper it is collected in a solids separation operation as shown in Figure 1. It may be returned to oxidation and/or precipitation and/or leaching in several possible ways as discussed above and as shown in Figure 1.

The residual liquor, after complete Cu precipitation and solids separation, is also divided usually into two flows. One is sent to an $NH_3$ stripping operation. The other is used to dissolve $NH_3$ driven off in the stripping. Reabsorbed ammonia is recycled to oxidation and/or leaching, also may be used in one or more other flows as shown in Figure 1. Stripping, which in this case is preferably done by steam distillation, usually also causes precipitation of some of the dissolved non-cuprous metals. This precipitate is removed from the circuit of the present invention as a slurry in enough stripped liquor to balance the water in the system. Some dissolved salts of non-cuprous metals may also be in the liquid discard.

It can be seen from this broad description that the essential features of the process are simple. However, there are a number of factors which enter into the overall picture and require consideration and careful control. The leaching question has been discussed so far as is germane to this process. Steps subsequent thereto, while interlocking, are subject to certain practical considerations which enter into successful operation. Particularly is this true with respect to the balancing of the circuit and the proportioning of the various flows.

First, a suitable reducing gas must be used for metal precipitation. In the present process, carbon monoxide is to be preferred. As a source of carbon monoxide, substantially any available CO-containing commercial gas may be used. The presence of carbon dioxide or nitrogen as diluents have no adverse effect except for the necessary increase in the volumes handled. Producer gas may be employed satisfacorily and its use will be taken as illustrative. Other gases, such as water gas, reformed methane, and the like which contain CO may be used for their content of the latter.

As was noted in drawing, spent leach liquor from the leaching system is divided into different flows which are simultaneously treated in differing manners. One portion or flow is that which is directly oxidized to reactivate it as cupric leaching liquor. This is accomplished in any standard manner or apparatus, usually by counter-current flow of the liquor and oxygen in suitable tower or its equivalent. Oxygen may be supplied as air, oxygen-enriched air or oxygen, depending on economic considerations.

The volume so-treated should be adequate for, but not in excess of, the provision of the necessary grams/liter of cupric copper after being combined with recycled ammoniacal liquor from the ammonia absorption system. As will be shown below, this returned liquor may or may not be sent to the oxidizing tower before being used in leaching. All, or only a part, of the necessary cupric copper may therefore be provided by directly oxidizing otherwise-untreated spent leach liquor. In any case, the amount sent to oxidation will be governed essentially by the amount of cupric copper required therefrom during leaching.

One alternative flow should be noted. In some cases it may be desirable to increase the amount of liquor available for dissolving stripped ammonia. A convenient source is from this flow of fluid. It has been indicated as a dotted line in Figure 1. Ordinarily, however, this flow will not be required or used.

Figure 2:
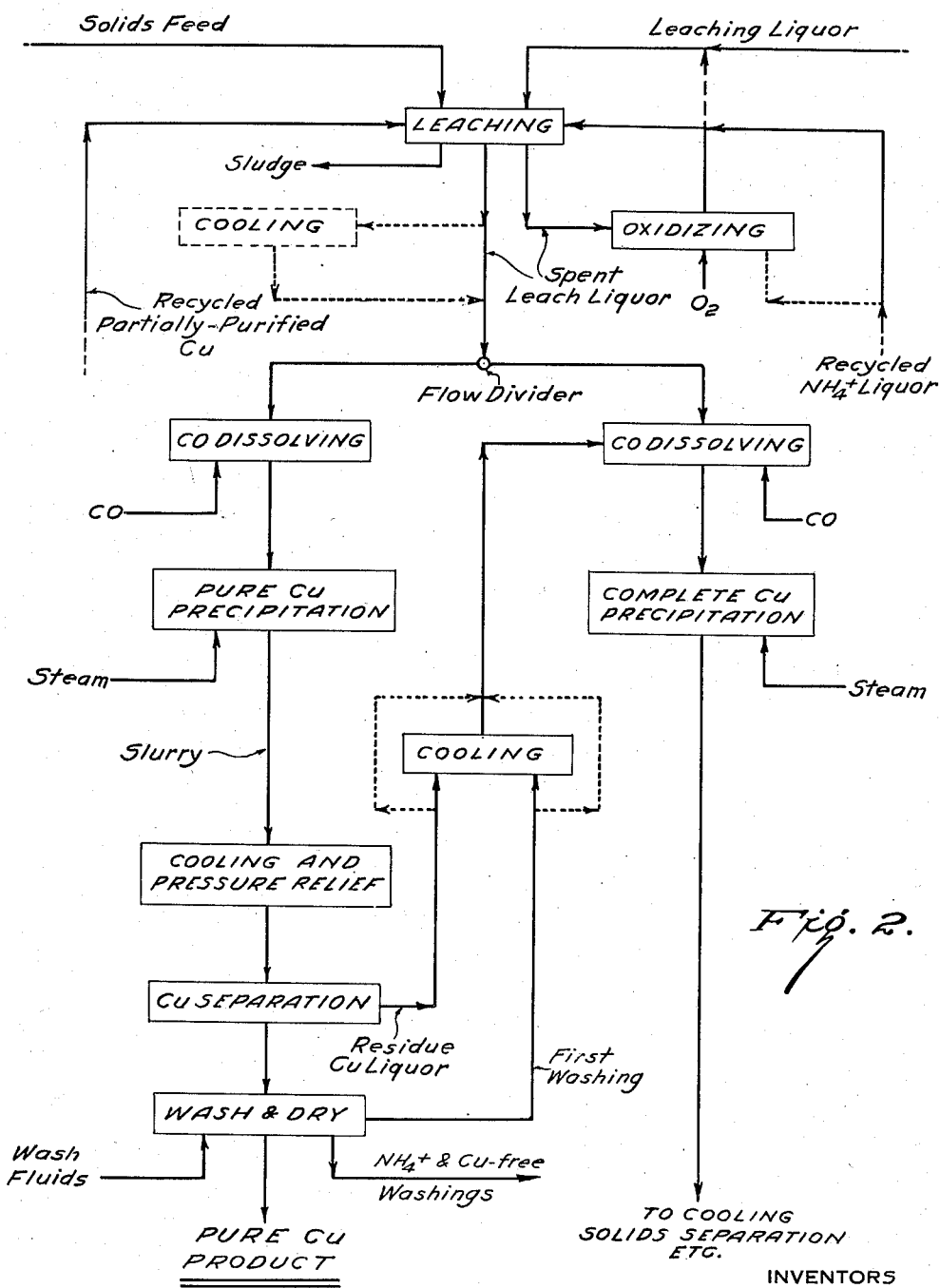
Figure 2 is a more detailed flow scheme of a part thereof showing one method of conducting the carbon monoxide saturation.
Figure 3:
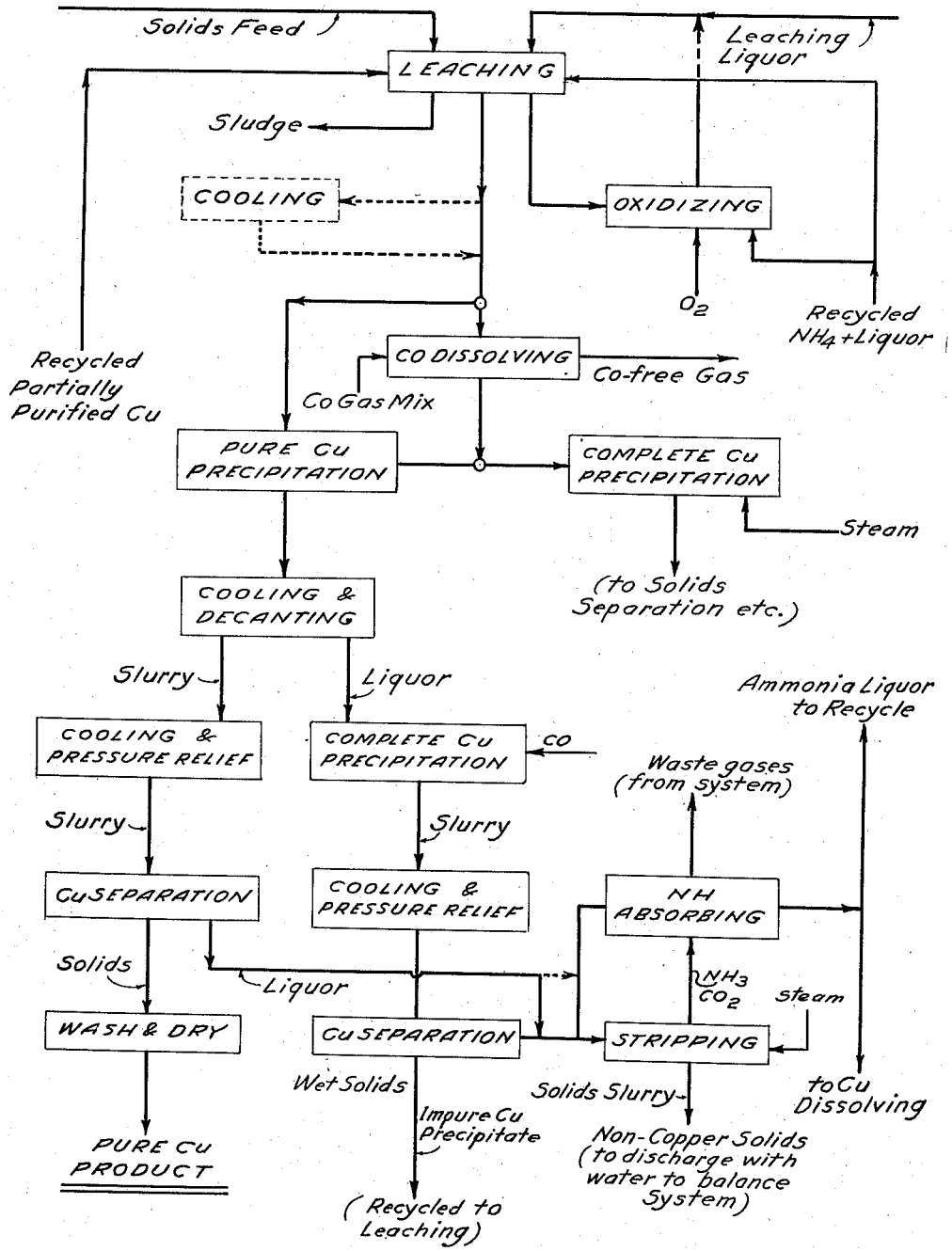
Figure 3 is a similar detailed flow scheme showing an alternative method of handling the CO flow.
Figure 4:
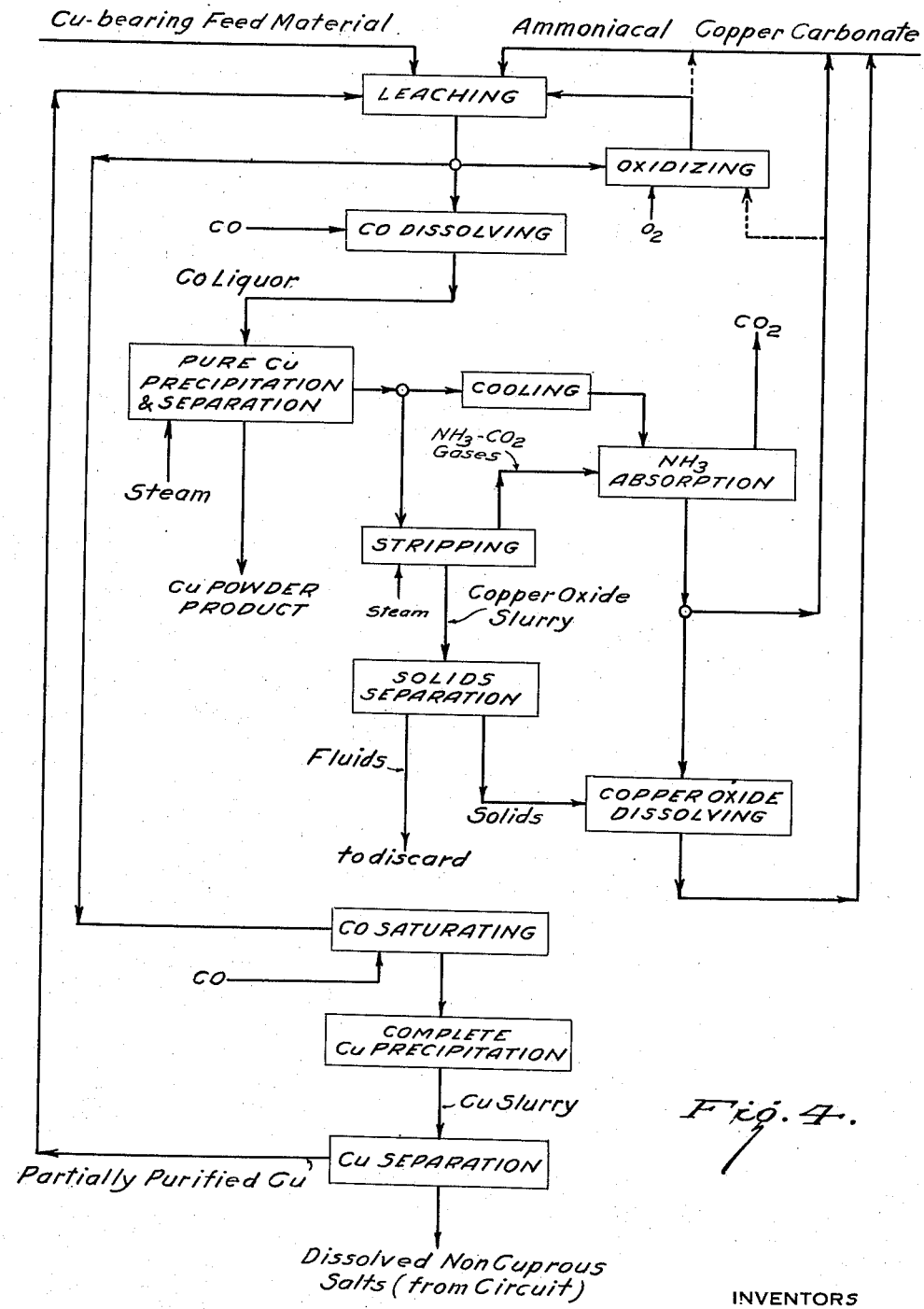
Figure 4 is a similar flow scheme showing still another alternative handling of the precipitation stages.

As was pointed out above, the residual withdrawn spent leach liquor is, in accordance with the present invention, divided into two or more flows. One such is treated to recover a pure copper product by partial precipitation, the other together with the washings and residual liquor after partial precipitation of copper of the first flow is subjected to complete copper precipitation. Each of these operations while shown in Figure 1 as single operations actually as was noted involves several steps. Many of these steps are common to both. These include, for example, dissolving sufficient reducing CO gas; precipitating the metal; collecting the metal; separating $NH_3$ from the liquid; recovering the $NH_3$ and recycling the recovered $NH_3$. These steps may be inter-related in any of several ways. Illustrative flows are shown in Figures 2, 3 and 4. Others may be designed without departing from the scope of this invention.

In Figures 2-4 only a part of the overall process has been set out. However, their relationship to the overall process flowsheet of Figure 1 is believed to be quite clear. The leaching and oxidizing flows are shown as being the same. The same product recovery is shown. After the complete copper precipitation, the steps of solids separation, solids recycling, gas recovery and recycling and discard of secondary products to balance the system may be the same as in Figure 1 so these have merely been indicated and not set out in full.

The first actual step in both the metal precipitation circuits is to dissolve CO in the liquor. Suitable sources of CO have been discussed. In the illustrative case of producer gas, and similar gases, there will be present, after CO absorption, hydrogen and diluent gases. Such effluent gases, shown in Figurs 3, if they contain hydrogen form an excellent source gas to blanket all tanks and in the handling and drying and working up into pressed form of the pure copper product. In some cases they may also be sent to other processing steps not related to the present invention. Where only waste gases are present, they may be vented from the system. If a source of relatively pure CO is available as indicated for use in Figure 2, there may be no useful waste gases.

Actual dissolving of the CO should be carried out at a relatively low temperature. The CO is believed to be taken up by the formation of some complex metal salt molecule or ions which are fairly stable up to about 120°-125° F. and comparatively unstable above about this same range. However, the process is not necessarily intended to be limited by such explanation. During dissolution there is a tendency for the temperature to rise, usually to about 105°-115° F.

In any case it has been found desirable to carry out the dissolving step or steps below this upper temperature range of comparative stability. The spent liquor should be below about 90° F., and preferably well below, for example 35°–70° F., if possible. Accordingly in Figures 2–4 provision is made for an optional flow of all or a part of this liquor through a cooler to insure this condition. If not needed, this cooling step may be omitted. However, cooling of at least some of this liquor is often desirable.

Since the solution is ammoniacal, any effluent gases may contain some ammonia. If so, the latter should be picked up by cold water washing in one of the absorption towers or in a separate apparatus. Such a step would be conventional and is not illustrated.

There is obviously some relationship between the amount of CO available for reduction, the amount of available copper and the time, temperature and pressure of reduction. This permits some variations in flowsheet of the process. One such variation is shown in Figure 2. In that scheme the reducing gas used is assumed to be CO and no effluent gases are shown.

The process, as shown in Figure 2, is primarily intended for controlling the extent of Cu precipitation by dissolving in the liquor only enough CO to precipitate the desired amount of copper, i. e. that fraction which can be obtained pure. A good general practice is to precipitate about 70% of the total available copper. However, in some cases a much larger fraction may be obtainable.

In some cases it may be necessary that less than 70% be precipitated in order to maintain the desired purity. If so, this amount should be the limiting factor. As noted, in most cases the 70% limit can be exceeded if necessary or so desired. However, since all copper will eventually report in this fraction, it is usually undesirable to do so. It is good practice to stay below the theoretical maximum possible for some runs in order to insure successful care of handling of variations in flow rates and copper content.

While other practices may be used if desired or necessary, operation of the flow shown in Figure 2 is ordinarily, therefore, based on the fact that under properly controlled conditions the liquor after CO absorption can contain cuprous copper, cupric copper, carbon monoxide and water in the correct mole ratio to precipitate about 70% of the copper content as 99.9+% pure copper. Ordinarily this is about the set of conditions which should be sought to be maintained in practicing this method.

Continuing with the flow of Figure 2, precipitation of the pure copper is accomplished by transferring the liquor to a suitable pressure vessel and raising its temperature, usually by live steam injection. Indirect heating may be used if care is taken to prevent build-up on the coils. Temperatures to above about 150° F., usually to about 250°–350° F. being a good practice. The time of treatment will vary with the temperature. Preferably, also, the pressure vessel should be equipped for mechanical stirring, which will markedly improve the rate of reaction. A fifteen minute treatment with agitation at about 300° F. generally will constitute a good average practice. Ordinarily pressure is not a limiting factor and will be that corresponding to the temperature, the latter being the factor measured and controlled. Temperatures above about 350° F. may be used if so desired; however, to do so is seldom necessary and will ordinarily be found to unduly increase the apparatus requirements.

While the present process may be operated batchwise, precipitation of copper preferably should be accomplished in a continuous fashion. Steam and pregnant liquor are continually added to the vessel and copper powder slurry and spent liquor, continually discharged under pressure. Under such practice, the effluent copper slurry is indirectly cooled to about 150° to 175° F. and the pressure thereon reduced to atmospheric. Since there is little or no residual dissolved CO in the usual practice discussed above, in this range the vapor pressure of the liquid will be about atmospheric and this constitutes a good and generally preferable average practice.

Metallic copper is separated from this slurry, then washed and dried. Preferably, this is done using successive washings with ammonia-bearing liquor water and then with water. If so desired it may also be washed with reagents to remove minor traces of other metals. Finally, it should be washed with water. Wet copper metal is mechanically dried to the extent found practical, followed by complete drying in a hydrogen atmosphere and heating to about 400° F. As noted above, the off-gas after absorbing CO from producer gas or the like is a good source of gas for steam-stripping and drying during these operations.

After separating the pure Cu product, the residual Cu liquor is combined with all of the copper washing liquors which contain ammonia. This with the residual spent liquor flow is then treated to precipitate all the copper dissolved therein as in Figure 1. As shown in Figure 2, this residual Cu liquor and any ammoniacal wash waters are ordinarily sent through a cooler to insure their being below the 90° F. preferred temperature. It may not be necessary to cool all of these liquors. If not, the cooler may be by-passed for part of the flow as shown in the optional flow lines.

Since for the process outlined in Figure 2 only about so much CO is ordinarily absorbed as will precipitate the pure Cu friction, the mixture of flows will need more CO to precipitate the residual copper. Together with the remaining untreated leach liquor flow they are therefore sent to a second CO dissolving step, as shown. At least enough CO to reduce the total Cu content to metal is then dissolved therein. The CO-treated liquor is then passed to a suitable pressure vessel for complete Cu precipitation.

Precipitation of this second copper portion may be carried out in any desired manner. Probably most convenient conditions are again those set forth above for the first precipitation. Heating ordinarily should continue for a considerably longer period of time than is usual for the first Cu precipitating step. Thereby substantially all of the copper will be reduced to metallic copper. It is collected and recycled as will be discussed. Any other unprecipitated dissolved metals remain in the solution along with carbon dioxide and ammonia. Again, a continuous flow through this circuit is preferably maintained. The next steps are the same as for the pure Cu circuit, i. e., pressure relief, cooling and solids separation. Washing and drying, as will be seen, are not necessary.

After the resultant slurry has been pressure relieved and cooled, it is passed to a solids separation step such as that shown in Figure 1. Once the overall operation is established, the proportional flows between the two copper precipitation circuits should be adjusted to provide optimum economic recovery of pure copper powder.

If the assumption is correct that CO is dissolved by forming a complex with cuprous copper salts, each mole of complex should provide CO to reduce two moles of cuprous copper to metallic copper. Therefore, it should be readily possible to cause the solution to take up more CO than would dissolve in the same volume of water and more than enough to precipitate all the copper. Since this is found to be true in the present invention, this assumption seems verified. By taking advantage thereof, another operational flow-sheet may be devised. This is illustrated in Figure 3.

As shown therein, spent liquor is withdrawn from leaching, and again one part is separated, being oxidized without further treatment. The remainder, after cooling, if necessary, is again divided. One part is sent to a single CO dissolving step in which it is caused to take up enough CO to precipitate all the copper. CO-containing liquor is then divided. One flow is sent to the pure Cu precipitating circuit, the remainder to the complete precipitation circuit. Apparatus requirements of the two circuits are substantially the same. Since enough CO is present in the flow to the pure copper precipitation circuit to precipitate more Cu than the pure product fraction, other controls are necessary.

Precipitation of only the pure fraction may be obtained by controlling the temperature and/or time of treatment. However, to do so would result in CO and $NH_3$ evolution on the pressure being relieved in order to recover the pure copper from the resultant slurry. It is best, therefore, to divert a flow of spent liquor around the CO-dissolving step to the pure copper precipitating step. In amount this diversionary flow should be enough to reduce the dissolved CO to copper ratio to that at which only the pure Cu will precipitate. The precipitate is then separated and collected as in Figure 2. The residual liquor and any washings containing copper and/or ammonia are then passed directly to the complete precipitation step rather than to a second dissolver as in Figure 2.

A number of variations in flows are possible after the complete copper precipitation. An illustrative procedure is set forth in Figure 1. Ordinarily the resultant slurry is decanted. Preferably, but not necessarily this is done continuously and under pressure. If so the slurry is again indirectly cooled and pressure relieved as was discussed in conjunction with collection of the pure copper. In any case, slurry at about atmospheric pressure and at below about 115°–125° F. is sent to a solids separation. The solids and the liquid are then treated for recycling.

Liquor treatment probably should be the first to be considered. As shown in Figure 1, it is divided into two flows. One is sent to a stripping operation and the other is used to redissolve $NH_3$ liberated during stripping. In some circuits, depending on the available apparatus, it is possible to directly decant some solids-free liquor directly from the complete Cu precipitator. If so, it is sent directly to stripping as shown in the optional flow lines of Figure 1.

Stripping is preferably carried out in a suitable plate column, or its equivalent, at about atmospheric pressure, preferably with live steam. Evolution of $CO_2$ ordinarily is much faster than that of $NH_3$. Accordingly in some cases enough $CO_2$ can be driven off to balance the circuit without loss of ammonia. If so it is directly vented after washing $NH_3$ therefrom. It is usually desirable not to rely on this procedure. The preferable procedure is, as shown in Figure 1, by stripping all $NH_3$ and $CO_2$ and redissolving the $NH_3$.

The remaining liquors are used for absorption. Preferably they should be cooled if necessary to below about 90° F. in some conventional cooler. Liquor is passed through a packed tower, or its mechanical equivalent, countercurrently to a stream of the stripped gases. Substantially all of the $NH_3$ is dissolved. However, the rates of absorption for $CO_2$ and $NH_3$ differ sufficiently so that 95% of the ammonia can be dissolved, while dissolving only about 10% of the carbon dioxide. The undissolved gases should be treated with cold water to pick up any remaining $NH_3$, and an additional small portion of $CO_2$ in a separate section. However, the overall result is the evolution of sufficiently more $CO_2$ in the stripper than will be redissolved and in this way the necessary amount of $CO_2$ is removed from the overall system to effect the material balance.

The still bottoms will contain the residual non-cuprous metals. Some, for example zinc, will be precipitated, principally as the carbonate. Some will remain dissolved. This slurry is withdrawn containing enough water to balance the various steam and water inputs and keep the material balance in equilibrium. So far as the present invention is concerned, this constitutes the principal discharge of non-cuprous metals dissolved during leaching.

Discharge from the ammonia reabsorption operation usually will be found to be at about 125°–145° F. This ammoniacal liquor is used, if necessary that it contain copper, to dissolve all or part of the copper solids from the second copper precipitate, as shown in the drawing. However, a divided flow is shown because at least a major portion, if so desired, may be returned directly to the leaching step. This return ammonia liquor may be directly recycled with or without oxidation as shown and as was noted above. The amount to be oxidized will depend upon whether sufficient cupric copper for effective leaching is provided by the fraction of spent leach liquor which is directly oxidized.

Leach liquor which is to be returned to the dissolving tanks will be a composite made up of oxidized spent leach liquor and the return ammoniacal liquor obtained after the $CO_2$ removal, and when used, copper-dissolving operations just discussed. These liquors either separately or, as shown, after being commingled are subjected to oxidation. Again it is desirable to operate below about 90° F. to favorably influence the absorption rates. Again since cooling is done in conventional apparatus and only if necessary, the cooler is not shown. Liquors are passed through a suitable oxidizer, usually a packed tower, countercurrently to a stream of air, oxygen, or oxygen-enriched air. Some ammonia may be driven off. If so it is redissolved in cold water in a separate operation and is added to the oxidized liquid effluent.

A still further variant of the overall process is illustrated in Figure 4. In that process carbon monoxide is dissolved in two stages and several possibilities discussed above are shown. The feed material is leached and pregnant leach liquor is withdrawn and a part oxidized and recirculated. This is the same practice as shown in Figures 2 and 3.

However, the remainder of the treatment is slightly different. The remaining spent liquor is divided into two flows, one portion, usually the major portion, is treated to recover the copper content. The remainder is sent to a separate side circuit to discard any other non-cuprous metals which may dissolve.

The carbon monoxide-containing liquor is subjected to the steps of precipitating and separating the pure copper product in the same manner as was previously discussed. However, this circuit is especially well adapted to a maximum precipitation of pure copper. In some cases substantially all the dissolved copper in this fraction may be recovered as of requisite purity. Any residual dissolved copper, however, is treated somewhat differently from the circuits above. The residual liquor after pure copper removal is divided into two portions. One is subjected to steam stripping in which ammonia and carbon dioxide are driven off and the copper content is precipitated as copper oxide. A slurry of the latter is treated to remove the solids. Any residual liquor is discarded from the system to balance the water intake. If there is more than is required to balance it may be recycled.

The other portion of the liquor is used to dissolve the ammonia driven off during the stripping operation. As was noted, $CO_2$ being less soluble than the ammonia, will to a large degree pass from the absorption tower and is discarded to balance the system. The redissolved ammonia is used in such amounts as necessary to dissolve the copper oxides obtained from the stripping step. This copper-bearing liquor is recycled to the leaching step. Any ammonia liquor not required in the copper oxide dissolving step is directly recycled.

The remaining fraction of untreated spent liquor is sent to a separate carbon monoxide saturator. It is caused to pick up enough CO to precipitate all the copper, regardless of purity. After saturation the copper content is completely precipitated under heat and pressure in the manner noted above. Copper is removed and recycled to the leaching step. Residual liquor, containing dissolved salts of non-cuprous metals, is, so far as the present invention is concerned, withdrawn from the circuit. This provides an additional point of water discard as well as removal of unwanted metal salts. As in previously discussed flow systems, once equilibrium is established the two flows may be balanced to provide for optimum recovery of the pure copper product.

From the foregoing discussion, it will be seen that the present process involves several distinct features. They account for its markedly improved efficiency over such processes as are now commonly practiced in the art. They include the precipitating of only pure copper in one circuit; the precipitation of all copper to permit purging; and recycling of precipitated copper from the second precipitation. In this way the non-cuprous metals are more readily discarded when present even in large amounts. Water and $CO_2$ are eliminated to provide for material balance and continuous operation. There is little or no ammonia loss.

While the foregoing discussion has been principally concerned with copper, all the scrap metals which require treatment will not be solely copper. Some is copper clad steel. This presents no difficulty as the iron is substantially unaffected by the copper-ammonium carbonate solution. Other metallic scraps may contain zinc, lead, tin or nickel, for example. Ores which contain native copper or copper oxides and such crude commercial products as blister copper may also be treated if so desired.

As has been discussed, the portion of copper which precipitates between about 70% and 100% of the total copper originally in solution is less pure than that copper which precipitates at or below about 70%. Therefore, a separation must be made whereby all of the copper precipitating between 70% and 100% and the pure copper are kept separate. However, liquor containing this 70-100% fraction need not be mixed with the untreated liquor before treatment. For example, in batch operation the pure copper may be precipitated and removed and the remaining copper precipitated and removed. This second precipitate can either be mixed with that total precipitate from the non-cuprous metal purging flow or handled separately. In some cases the 70%—100% fraction after pure copper precipitation may not even be precipitated but may be directly returned to leaching. However, this can only be done when economy of operation permits sufficient purging of non-cuprous metals solely by treating only one portion to total copper precipitation.

Elimination of zinc, if present, has been discussed. Lead, if present in the leach feed, will partially dissolve as lead carbonate, soluble in ammonia. The balance will form a sludge in the leaching tanks, along with any tin and rare metals. These may be recovered. A portion of the soluble lead will be reduced with the copper in some cases. Proportionately, however, it precipitates very much slower than copper, so ordinarily it will not all come down. Precipitated lead, if any, may be removed readily by a suitable reagent in the washing liquid. This may be a soluble ferricyanide in a slightly acidic solution, the acid being selected from a group which forms soluble lead salts. It also may be removed with acetic acid, or a soluble acetate and an oxidizing reagent.

Nickel will dissolve to some extent along with copper and will be proportionately reduced. Like the lead, it may be washed from the copper. It will be removed by a weak sulfuric acid wash. Since the latter is ordinarily used to stabilize the copper, if for no other reason, this will be taken care of by normal operation. In the process of the present invention, the difficulty occasioned by nickel, cobalt and the like in the scrap is considerably reduced at the normal operating temperature, both in leaching and in copper metal production. In the present process both the leaching and the copper precipitation temperatures are well below the optimum conditions for these metals. Operating conditions are such that all the copper will be leached before all the nickel or cobalt can be dissolved, except when the latter are present in very small amounts proportionately to the copper.

We claim:

1. In recovering copper metal of high purity by leaching a copper and non-cuprous-metal-bearing mixed feed with an ammoniacal copper salt liquor, and precipitating copper therefrom, the improved cyclic process which comprises: treating a flow of leach solution at from about 150°–350° F. and under equivalent pressure for sufficient time in the presence of an equivalent amount of dissolved CO to precipitate substantially all the available dissolved copper therefrom; collecting and recycling the resultant copper precipitate; dividing the resultant copper-free liquor into at least two flows; steam-stripping one of said flows, whereby substantially all the available $NH_3$ is removed therefrom; discarding the stripped residue, whereby leached non-cuprous metals and water are removed from the circuit; dissolving the stripped NH₃ in the second divided flow and recycling the dissolved NH₃ to leaching; separately treating another flow of leach solution at about 150°–350° F., under equivalent pressure for a sufficient time, in the presence of at least an equivalent of dissolved CO to precipitate not more than so much of the available copper as will precipitate at not less than 99.9+% purity; recycling the NH₃ and copper content of the residual solution after said second precipitation, and collecting said second copper precipitate as product.

2. A process according to claim 1 in which a part of the first copper precipitate is dissolved in the redissolved ammonia liquor before recycling to the leaching operation.

3. A process according to claim 1 in which the solution remaining after said second copper precipitation is treated under heat and pressure with sufficient CO to precipitate substantially all the available copper therein and the resultant third copper precipitate is recycled to leaching.

4. A process according to claim 1 in which the solution remaining after said second copper precipitation is admixed with said second portion of leach solution before precipitating the copper content thereof.

5. In a process for recovering copper metal from copper-bearing material in which said material is leached with an aqueous ammoniacal solution of a copper salt and copper is chemically precipitated from leach liquor by treatment with a reducing gas; the improvement which comprises: withdrawing leach solution from such treatment, treating withdrawn solution, at a temperature not greater than 125° F., with carbon monoxide in an amount sufficient to dissolve therein a quantity equivalent to at least a major portion of the copper content of the withdrawn liquor, and heating resultant solution to above about 150° F. under equivalent pressure for sufficient time only to reduce and precipitate copper in metallic form therefrom in amount not exceeding that which is at least 99.9% pure.

6. In a cyclic process for the recovery of metallic copper from copper-bearing material in which said material is leached with an ammoniacal solution of a copper salt and copper is chemically precipitated from the resultant solution by treatment with a reducing gas; the improvement which comprises: withdrawing leach solution from such a leaching treatment; dividing the solution so withdrawn; separately treating at least one of the portions so obtained, at a temperature not greater than 125° F., with an amount of carbon monoxide sufficient to dissolve therein a quantity equivalent to the dissolved copper content thereof; separately treating at least one of the portions so obtained at similar temperature to dissolve therein a quantity of carbon monoxide equivalent to at least a major portion of the dissolved copper content thereof but not the entire copper content thereof; separately heating resultant solutions to above 150° F. under equivalent pressure for sufficient time to reduce and precipitate dissolved copper therefrom in metallic form; continuing the treatment under heat and pressure of both portions, the portion containing a full equivalent of carbon monoxide being treated until copper precipitation substantially ceases and the portion containing a partial equivalent of carbon monoxide being treated only for sufficient time to precipitate not more than so much copper than is at least 99.9% pure; collecting pure copper as product and collecting the copper from the complete precipitation and recycling any copper of less than 99.9% purity.

7. In a cyclic process for the recovery of metallic copper from copper-bearing material in which said material is leached with an aqueous ammoniacal solution of a copper salt and copper is chemically precipitated from the resultant solution by treatment with a reducing gas; the improvement which comprises: withdrawing leach solution from said leaching; dividing the withdrawn solution into at least two portions, introducing carbon monoxide into solution in one of said portions in an amount sufficient only to precipitate so much of the dissolved copper content thereof as will precipitate at a purity of at least 99.9% when subjected to heating at above 150° F. under equivalent pressure; subjecting said portion to said heat and pressure until precipitation substantially ceases and collecting the precipitated copper as product; combining residual copper-bearing liquor with the remaining withdrawn leach solution; treating the combined liquors with sufficient carbon monoxide at above 150° F. and under equivalent pressure for sufficient time to substantially completely precipitate the dissolved copper content, collecting so precipitated copper and recycling any copper having a purity of less than 99.9% purity.

LOUIS N. ALLEN, Jr.
PATRICK J. McGAULEY.
EDWARD S. ROBERTS.

References Cited in the file of this patent

UNITED STATES PATENTS

| Number | Name | Date |
|---|---|---|
| 656,544 | Hirsching | Aug. 21, 1900 |
| 682,232 | Beck | Sept. 10, 1901 |
| 1,686,391 | Muller et al. | Oct. 2, 1928 |
| 2,227,783 | Klumpp | Jan. 7, 1941 |